United States Patent [19]

Huang et al.

[11] Patent Number: 5,233,271
[45] Date of Patent: Aug. 3, 1993

[54] STARTING DEVICE AND LAMP BASE CONSTRUCTION FOR A PHILIPS LAMP

[75] Inventors: Lung-Hsiang Huang; Hsin-Hung Chung, both of P.O. Box 10780, Taipei, Taiwan

[73] Assignees: Lung-Hsiang Huang, Taiwan; Hsin-Hung Chung, Taiwan

[21] Appl. No.: 800,269

[22] Filed: Nov. 29, 1991

[51] Int. Cl.$^5$ .................................. H05B 41/29
[52] U.S. Cl. ................................... 315/86; 315/175; 315/DIG. 5
[58] Field of Search ................ 315/86, 161, 175, 312, 315/DIG. 5, DIG. 7

[56] References Cited

U.S. PATENT DOCUMENTS

| | | | |
|---|---|---|---|
| 3,573,541 | 4/1971 | Dunn et al. | 315/175 |
| 4,283,657 | 8/1981 | Gordon et al. | 315/86 |
| 4,682,147 | 7/1987 | Bowman | 315/86 |
| 4,749,908 | 6/1988 | Stifter | 315/161 |
| 5,004,953 | 4/1991 | McDonald | 315/86 |

*Primary Examiner*—David Mis
*Attorney, Agent, or Firm*—Pollock, Vande Sande & Priddy

[57] ABSTRACT

A lamp having a lamp base, switches, AC power supply, a Philips lamp, battery, and circuit board. In addition to a conventional circuit of AC for starting the Philips lamp, there is also a loop using DC to start the Philips lamp. The loop includes the conversion, oscillation, and amplification of AC and DC, as well as an automatic switching circuit. A conductive ring clamp mounted on the Philips lamp may light up the lamp by means of the battery when there is no supply of AC.

6 Claims, 5 Drawing Sheets

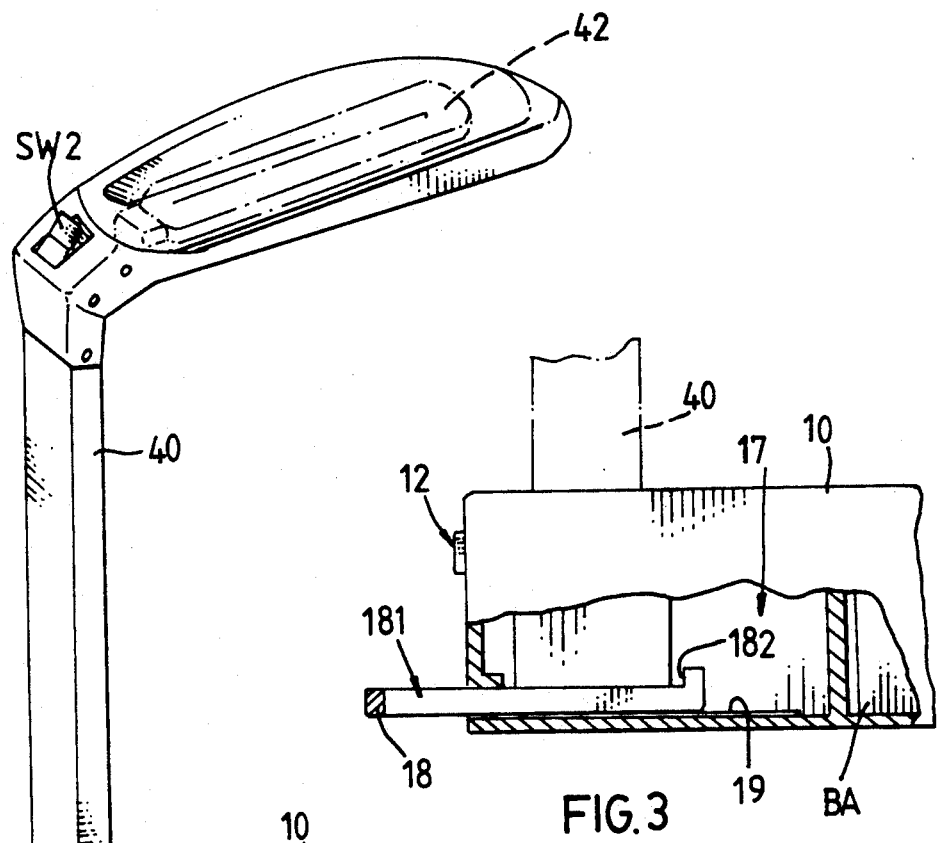
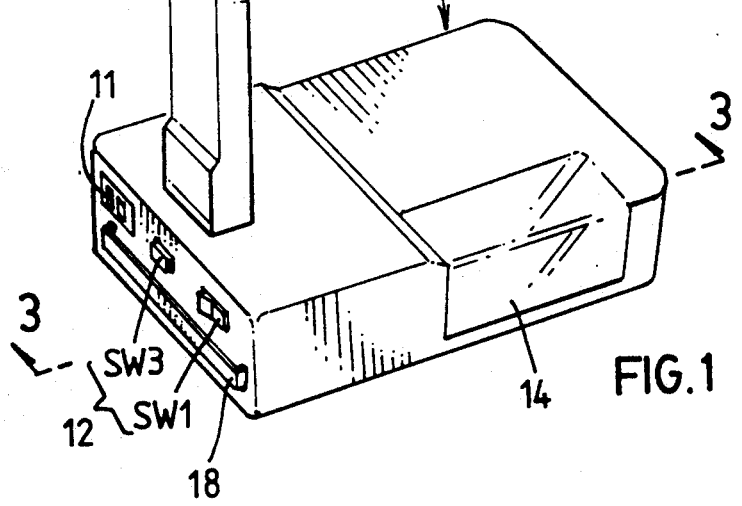
FIG. 3
FIG. 1

STARTING DEVICE AND LAMP BASE CONSTRUCTION FOR A PHILIPS LAMP

FIELD OF THE INVENTION

The present invention relates to a starting device, and more particularly an improved starting device and lamp base structure for a Philips lamp.

BACKGROUND OF THE INVENTION

The so-called Philips lamp is a kind of indoor fluorescent lamp which has greatly improved conventional fluorescent lamps such as mercury vapor lamps and the like. The light of the Philips lamp is more gentle, and harmful elements such as ultra-violet rays are diminished.

Because the duration of the Philips lamp is longer than that of both conventional light bulbs and fluorescent lamps, and its light is more gentle and it produces less heat, the Philips lamp is becoming more popular. However, whatever shape it has, the current Philips lamp is not as convenient as conventional light bulbs. For instance, light bulbs or some fluorescent lamps are suitable for use with a DC or AC power source. By disposing a transformer and a rectifier in the lamp base and putting a battery in place, conventional lamps using light bulbs or fluorescent lamps may be used with a DC or AC source. Therefore, the emergency lights for indicating the direction of exit provided at the emergency exits of most buildings are mainly light bulbs. Normally, the battery in such emergency lights is charged by an AC power source. When AC is cut in a power failure, the DC source of the electricity storing means will automatically start the bulb.

But up to now, there is not any Philips lamp that can use DC/AC power sources to automatically switch to DC power source when AC power fails in order that the lamp can work for a few hours. Furthermore, the construction of the conventional Philips lamp does not allow the lamp base to be detached from the lamp pole so that the lamp base itself becomes a portable Philips lamp. It is therefore necessary to improve the conventional Philips lamp so that it is more convenient for carrying and has wider applications.

SUMMARY OF THE INVENTION

The primary object of the present invention is to provide a Philips lamp which can be used with an AC source, and when AC power fails, the lamp may continue to send out light by means of electricity storing means and special circuit elements.

Another object of the present invention is to provide a lamp base construction for a Philips lamp so that the Philips lamp can be used not only indoors, whether it is provided on the table, the ceiling, or the wall, but also outdoors as a portable lamp.

It is very easy to misunderstand that the present invention is the same as the conventional emergency lights at emergency exits. When AC power failure occurs, such emergency lights can immediately make use of the electricity storing means to continue working, and this is also one of the functions of the present invention. However, if the Philips lamp is directly connected to the circuit of conventional emergency lights, it is impossible to start the Philips lamp when AC power fails. Therefore, the Philips lamp according to the present invention is not the same as conventional emergency lights, neither a mere substitution of lamp types.

The present invention may also be compared to the conventional Philips lamp. If the conventional Philips lamp does not have the improved configuration according to the present invention, it cannot continue to illuminate during an AC power failure. Likewise, without application of the invention, such a lamp cannot be carried outdoors for lighting.

BRIEF DESCRIPTION OF THE DRAWINGS

The foregoing and other features and advantages of the present invention will be more clearly understood from the following detailed description and the accompanying drawings, in which, FIG. 1 is a perspective view of a preferred embodiment of the present invention;

FIG. 3 is a partial side view of the lamp base, with a section showing the handle construction;

DETAILED DESCRIPTION OF THE PREFERRED EMBODIMENTS

Figure 2:
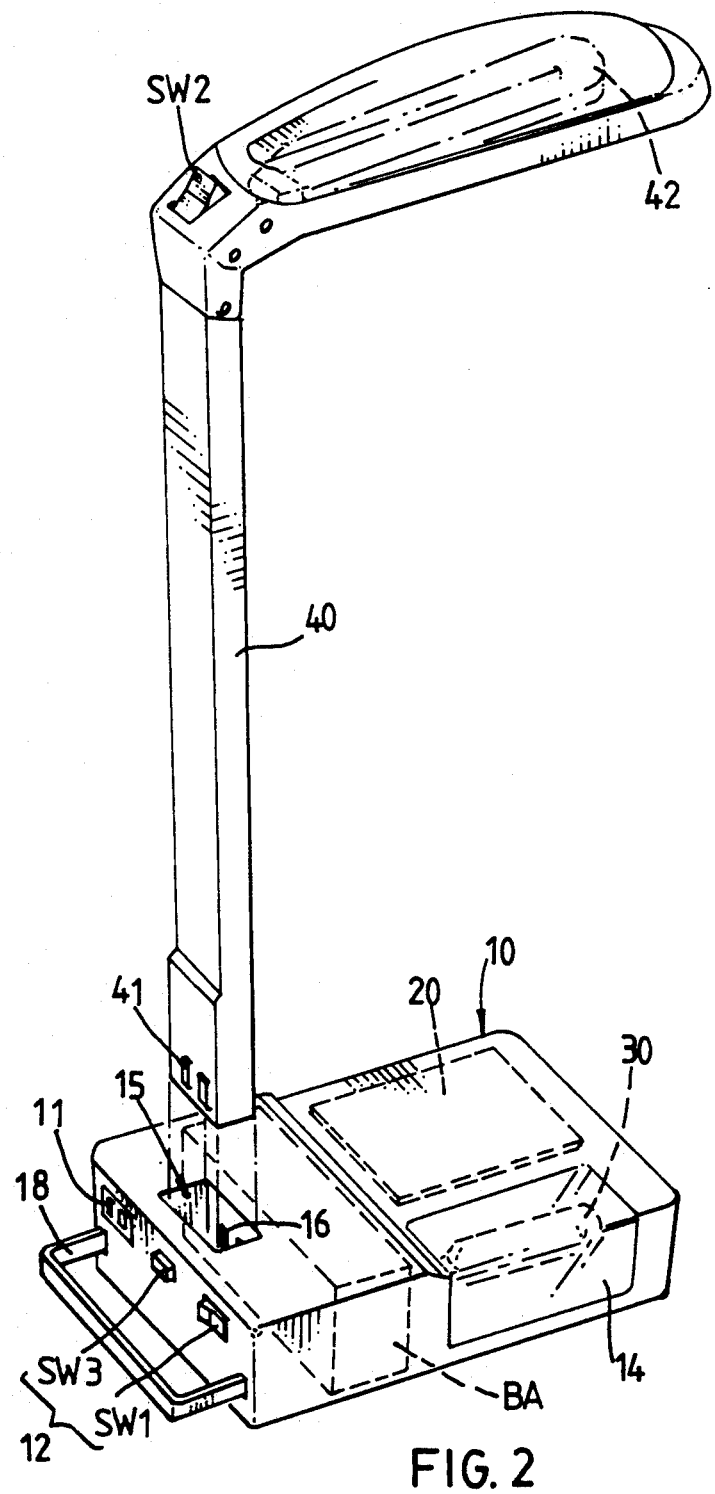
FIG. 2 is similar to FIG. 1, showing that the lamp pole and the lamp base are already detached.
Figure 4:
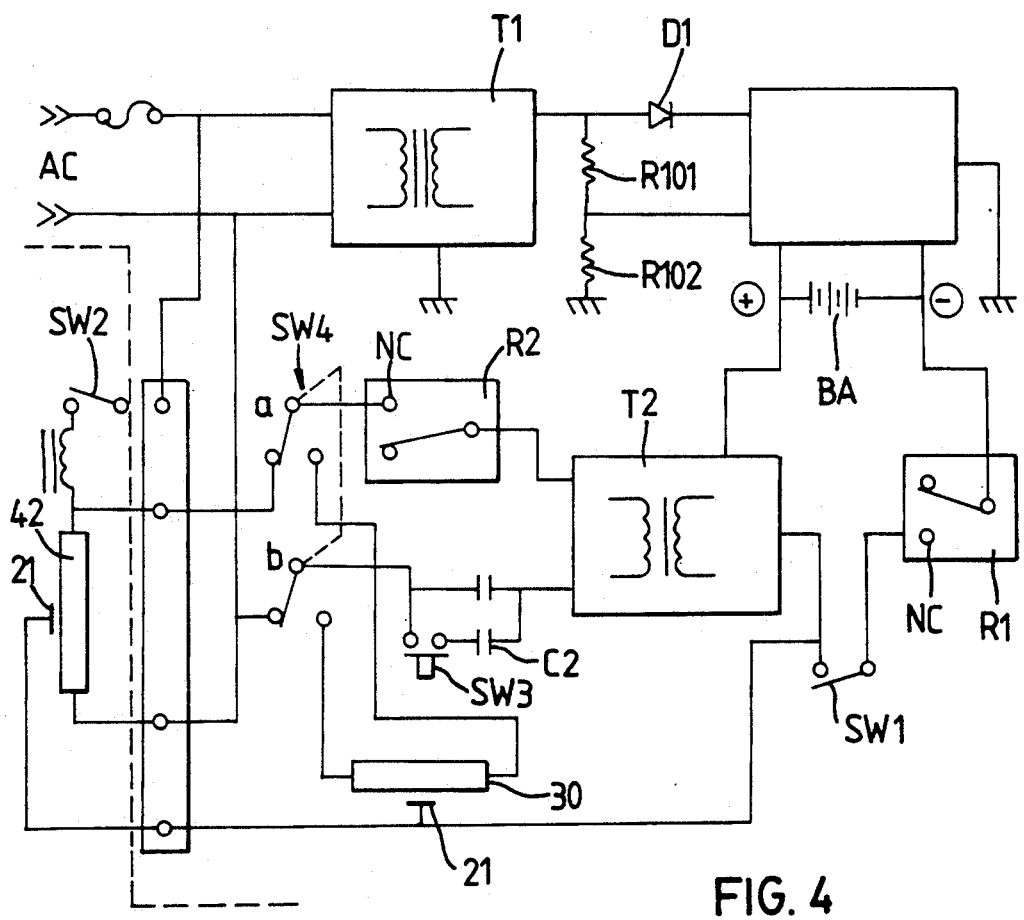
FIG. 4 is a block diagram of the circuit element within the lamp base.
Figure 5:
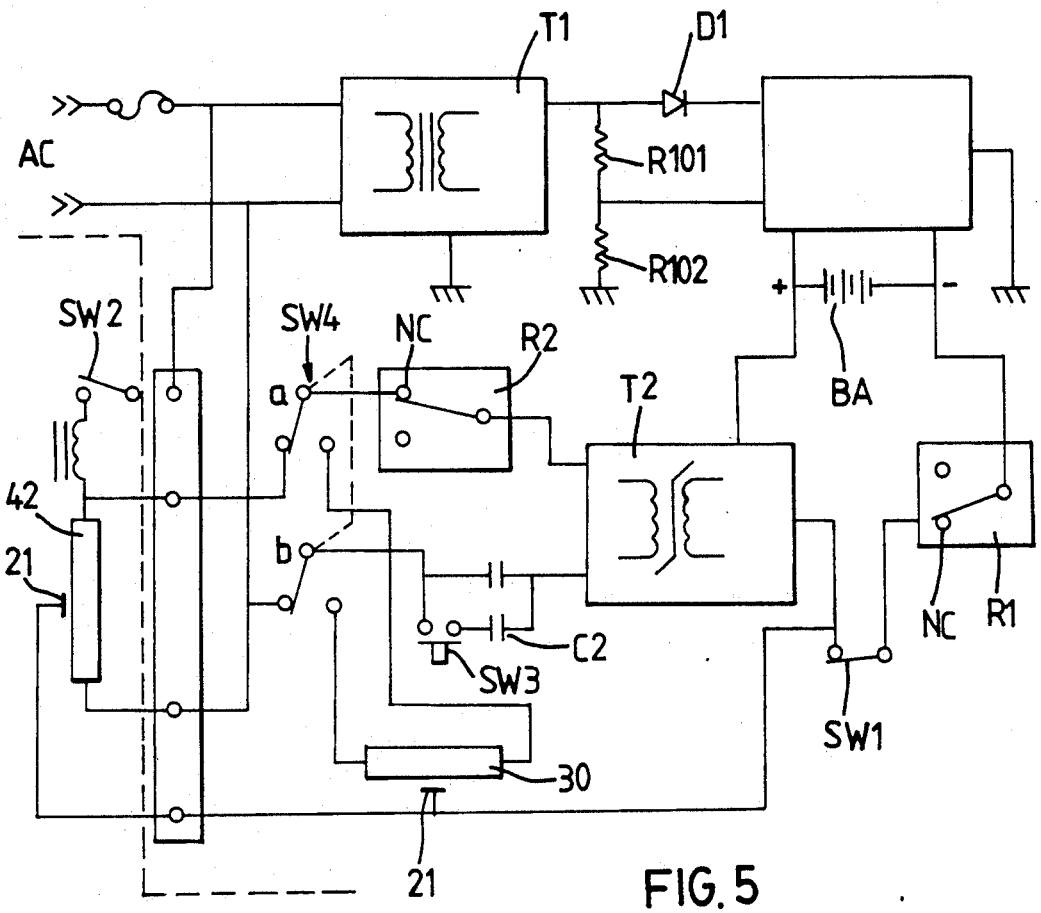
FIG. 5 is similar to FIG. 4, showing DC starting the Philips lamp.
Figure 7:
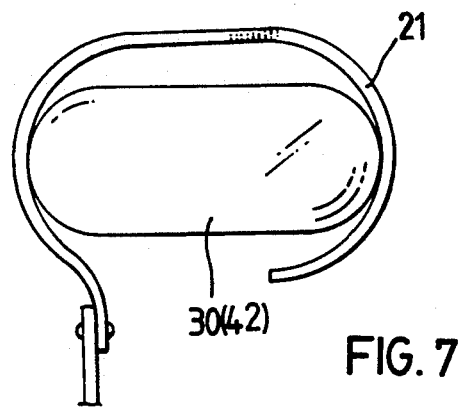
FIG. 7 is a side view of the ring clamp according to the present invention.
Figure 6:
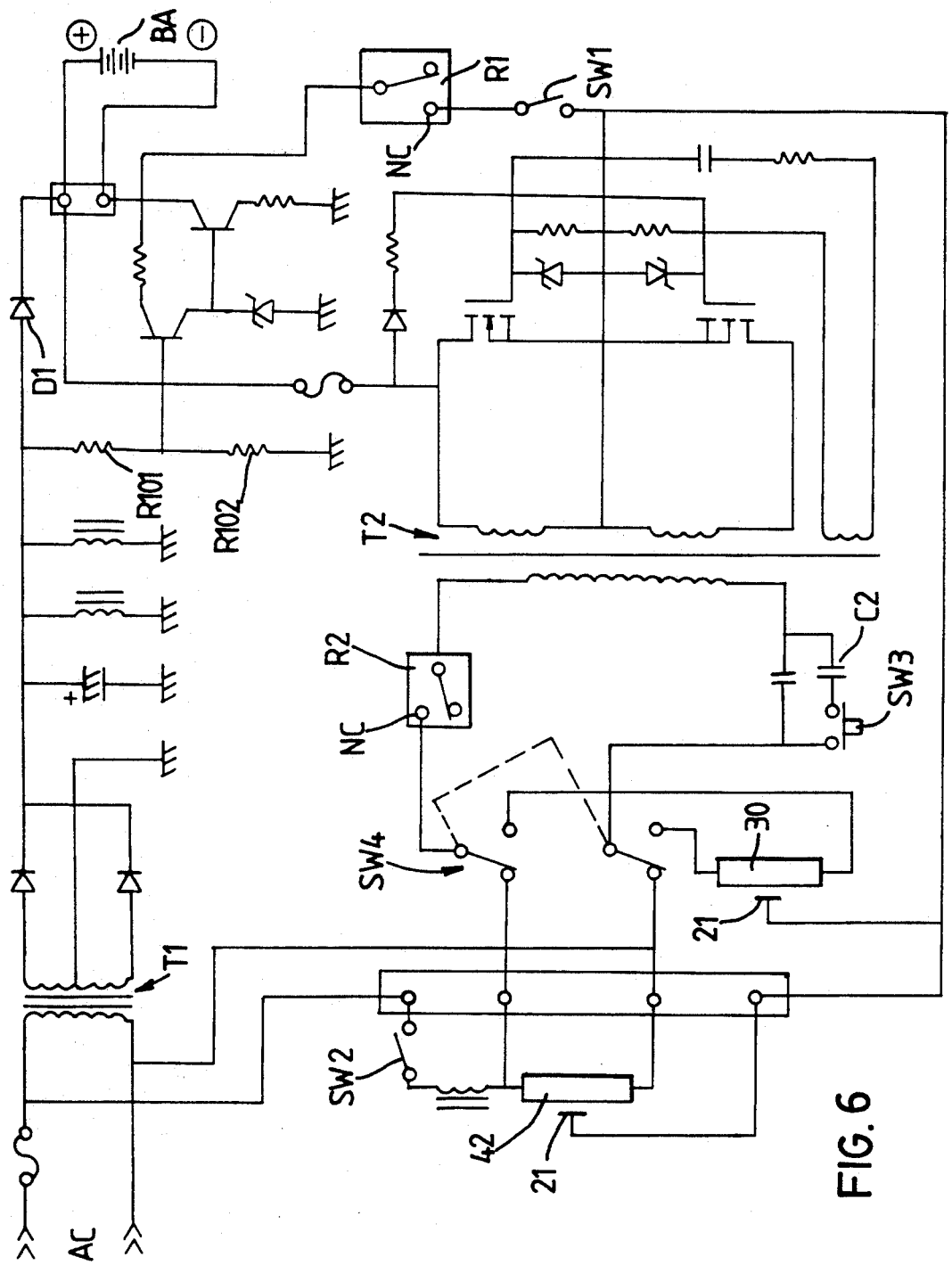
FIG. 6 is a circuit arrangement of the preferred embodiment shown in FIG. 5.

With reference to the embodiments as shown in FIGS. 4, 5, and 6, the starting device according to the present invention, which makes use of direct current (DC) to start the Philips lamp, comprises an auxiliary Philips lamp 30, a DC source means, i.e. a rechargeable battery BA, a circuit element consisting of a circuit board 20 (as shown in FIG. 2), the circuit element including a self-excited DC-AC transformed T2, and a control loop, wherein the power for the circuit element is supplied by battery BA. With reference to FIG. 7, a conductive ring clamp 21 mounted on the above-mentioned auxiliary Philips lamp 30 connects to the ground of the circuit element. The control loop in the above-referred to circuit element includes a first relay R1 for controlling the path from battery BA to auxiliary Philips lamp 30, and a second relay R2 for controlling the path from the self-excited DC-AC transformer T2 to auxiliary Philips lamp 30. Once the batttery BA releases power, both relays R1 and R2 are activated to allow the flow of current to the auxiliary Philips lamp 30.

The starting device as described above may exist independently or may be applied to any table Philips lamp, wall fixture, or ceiling fixture. Or it may be applied to flashing lights using the Philips lamp as a light source.

Hereinbelow, a Philips table lamp using AC under a normal circumstance is used as an example to further illustrate the present invention. The Philips table lamp may continue illuminating during an AC power failure.

As shown in FIGS. 1 through 3, the table lamp construction according to the present invention consists of a lamp base 10 which is a box-like body having an AC connector 11 and a plurality of power switches 12. AC power may be connected by means of the connector 11, and some of the switches 12 are for selecting the master lamp 42 or the auxiliary lamp 30; the other switches are for starting the lamp (to be described in detail hereinafter). In addition, the lamp base 10 has provided therein a battery BA, a rectifying transformer T1, and a circuit board 20 having a special circuit element as shown in FIGS. 4, 5, and 6.

One part of the lamp base 10 is provided with a translucent lampshade 14, preferably at a corner of the lamp base 10, so that when the auxiliary Philips lamp 30 which is concealed in the lamp shade 14 is lighted, it can send out light in the direction of the top and the sides of the lamp base 10.

The lamp base 10 has a socket 15 for insertion of a lamp pole 40. The socket 15 has accommodated therein a couple of conductive terminals 16; correspondingly the lower end of the lamp pole 40 is also provided with a couple of conductive terminals 41 which, via the electric wire in the lamp pole 40, are connected to a master Philips lamp 42 mounted on the lamp pole 40. When the lamp pole 40 is inserted into the socket 15 of the lamp base 10, the oscillated, amplified DC may be supplied to the master Philips lamp 42 (to be described in detail hereinafter).

For convenient carrying, a chamber 17 for storing a handle 18 is provided in one end of the lamp base 10. The chamber 17 has a track 19, and the depth of the chamber 17 is approximately the same as the height of the handle 18. The outer end of the handle 18 is a close loop 181, with the inner end thereof being provided with a protruding baffle 182 (as shown in FIG. 3). The close loop 181 is for carrying, and the baffle 182 is for blocking against the wall of the lamp base 10 when the handle 18 is pulled out along the track 19.

Certainly, the handle 18 may be formed in other ways and may still achieve the same object, and the above-mentioned components may also be arranged on the lamp base 10 in ways different from that shown in the drawings. The aforementioned circuit element chiefly comprises a conventional loop of AC to start the lamp, and a special loop of DC, e.g. DC6V, to start the Philips lamp(s). This special loop mainly consists of a self-excited DC-AC transformer, a battery recharging loop, and a control loop.

As shown in FIGS. 4, 5, 6, and 7, the circuit includes a transformer T1, resistors R101 and R102, a diode D1, a first relay R1, a second relay R2, a capacitor C2, a self-excited transformer T2, and 4 switches: the first is an master lamp switch SW2, the second is an auxiliary lamp switch SW1, the third is an instantaneous close loop push-button switch SW3, and, if both the master lamp and auxiliary lamp are to be provided in the same device, a four pole switch SW4.

With reference to FIG. 7, conductive ring clamps 21 are provided to clamp and holds both the Philips lamp 42 and 30. Each ring clamp 21 is connected to the ground in the circuit element. This configuration permits the collision of electrons inside the Philips lamp 42 or 30 to remain stable so as to instantaneously light the lamp.

The above-mentioned switch SW3 is not a necessary element. After starting the Philips lamp, it returns to its original position to cut off the path to the capacitor C2 to prevent the loss of electricity from the battery BA so that the life of the battery BA may be prolonged and the battery BA may, when electricity breaks down, supply electricity to the starting device.

The operation of the circuit is described in two conditions as below:

(1) When AC is connected:

AC current passes through transformer T1 so that charging electric current, after rectification via diode D1, is charged into battery BA. At this time, the loop disposed in the transformer T2 for converting AC into DC remains inactive because the transformer T2 is controlled by the relay R1 so that the transformer T2 becomes non-conductive.

Under the above-mentioned charging state, resistors R101 and R102 proceed to control the charging current so that when the battery BA is fully charged, the charging current will automatically become less to prevent overcharge, which may cause the battery BA to become too hot and consequently shorten its life.

When the AC source is used, generally about 13 W will be supplied to the Philips lamp 42 by switching on the switch side.

(2) When AC fails:

The battery BA, which is fully charged under normal circumstances, immediately releases electricity, and DC is converted AC; at this time, if the switch SW1 is turned to ON, the connector of the relays R1 and R2, because of the release of electricity by the battery BA, automatically switches to the position of NC (Normal Close); electricity passes through switch SW1 and relay R1 back to the negative end of battery BA for the conversion of DC into AC. At this time, AC voltage remains at about 500 VPP, frequency at 20 KHz. This output voltage passes through the NC connector of another relay R2, switch SW4, master lamp 42, and then back to the capacitor C2 to form a closed circuit. By disengaging the lamp pole 40 from the lamp base 10 as shown in FIG. 2, the switch SW4 may be switched to another position so that electric current passes to the Philips lamp 30 on the lamp base 10 to form a closed circuit and light the Philips lamp 30.

Therefore, when there is any electricity failure, the starting device according to the present invention may light up either the master lamp 42 or the auxiliary lamp 30. This characteristic is not found in any known Philips lamp lamps. Hence, the scope of protection which may be granted to the present invention should include the article embodying the starting device, the article including either the auxiliary lamp or the master lamp, or both, and the invention should not be restricted to having both lamps at the same time.

The function of the above-mentioned SW3 is that when the voltage of the battery BA is low, (about 5 V) it may restart the master lamp 42 or the auxiliary lamp 30.

Although the present invention has been illustrated and described with reference to the preferred embodiments thereof, it should be understood that it is in no way limited to the details of such embodiments, but is capable of numerous modifications within the scope of the appended claims.

We claim:

1. A device for lighting a Philips lamp from a direct current source, said device comprising:
    a DC power source means;
    a circuit element having a self-excited DC-AC transformer and a control loop, power for said circuit element being supplied by said DC power source means;
    a conductive ring clamp for mounting onto said Philips lamp, said conductive ring being connected to a ground in said circuit element;
    wherein said control loop comprises:

a first relay for controlling the path from said DC power source means to said Philips lamp;

a second relay for controlling the path from said self-excited DC-AC transformer to said Philips lamp;

wherein both said first relay and said second relay are activated to connect said DC power source means to said Philips lamp once electric current is released by said DC power source means.

2. A device as claimed in claim 1, wherein said control loop in said circuit element has a push-button switch in between said second relay and said Philips lamp.

3. A device as claimed in claim 1, wherein said DC power source means is a rechargeable battery.

4. A Philips lamp, construction comprising:
a lamp base having a translucent lampshade;
a Philips lamp concealed in said lampshade;
a DC power source means fixed in said lamp base;
switches provided in said lamp base for controlling said DC power source means;
a circuit element provided in said lamp base and connected to said DC power source means, said circuit element having a self-excited DC-AC transformer and a control loop;
a conductive ring clamp for mounting onto said Philips lamp, said conductive ring being connected to a ground in said circuit element;
wherein said control loop comprises:
a first relay for controlling the path from said DC power source means to said Philips lamp;
a second relay for controlling the path from said self-excited DC-AC transformer to said Philips lamp;
wherein both said first relay and said second relay are activated to connect said DC power source means to said Philips lamp once electric current is released by said DC power source means.

5. A Philips lamp as claimed in claim 4, further comprising:
an AC power source means provided in said lamp base;
a lamp pole, the upper end thereof being provided with a second Philips lamp, with the lower end of said lamp pole having a conductive means connected to said second Philips lamp;
wherein a socket is provided in said lamp base for insertion of the lower end of said lamp pole, said socket having disposed therein a couple of conductive terminals for connecting to said conductive means at the lower end of said lamp pole, said conductive terminals connecting said AC power source means in said lamp base.

6. A Philips lamp as claimed in claim 4, wherein one end of said lamp base is provided with a chamber having a track along which a handle is inserted.

* * * * *